B. R. BENJAMIN.
GRAIN BINDER.
APPLICATION FILED APR. 30, 1914.
1,188,393.
Patented June 27, 1916.
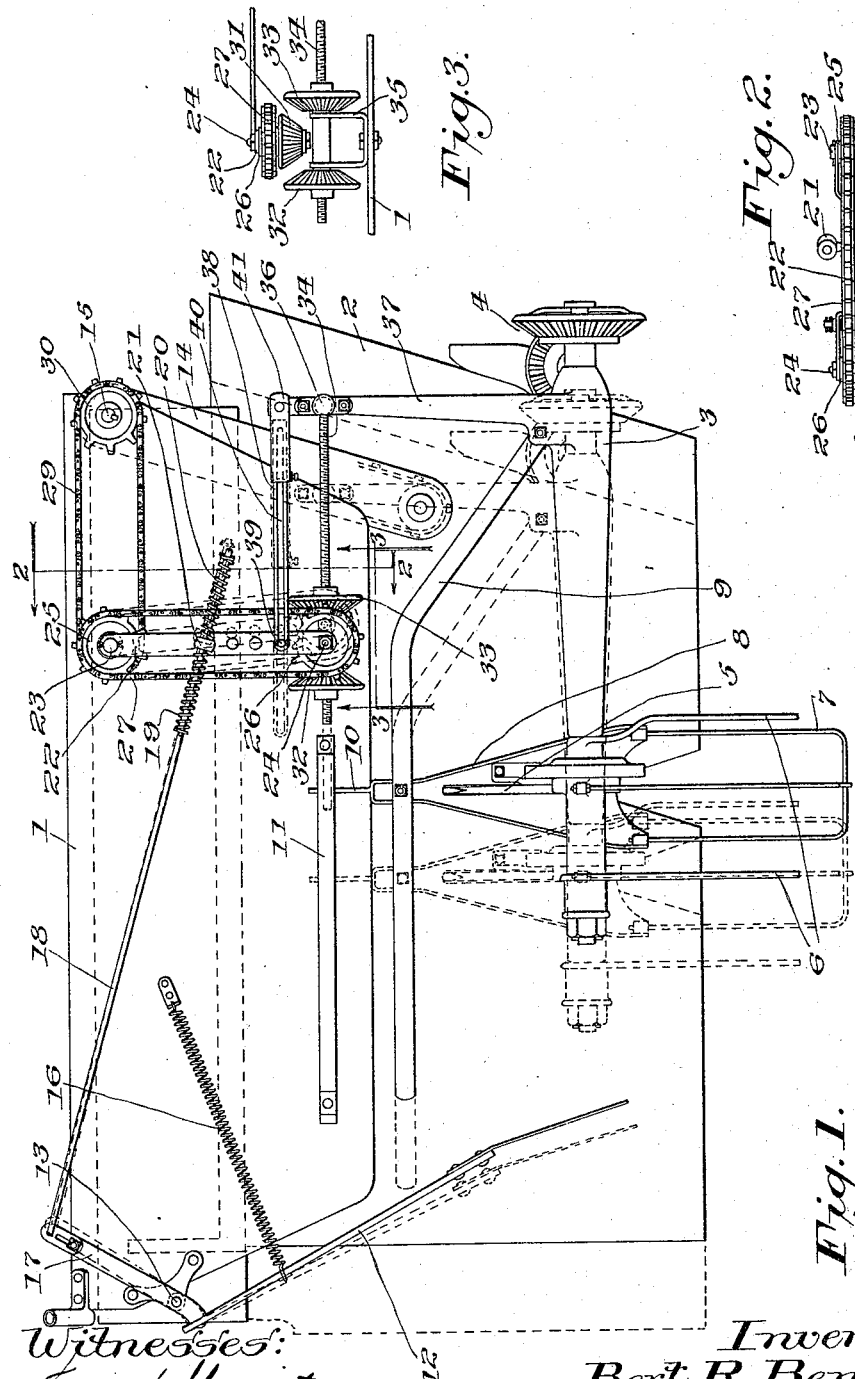
Inventor.
Bert R. Benjamin,
By
Atty.
Witnesses:

UNITED STATES PATENT OFFICE.

BERT R. BENJAMIN, OF OAK PARK, ILLINOIS, ASSIGNOR TO INTERNATIONAL HARVESTER COMPANY OF NEW JERSEY, A CORPORATION OF NEW JERSEY.

GRAIN-BINDER.

1,188,393. Specification of Letters Patent. Patented June 27, 1916.

Application filed April 30, 1914. Serial No. 835,393.

*To all whom it may concern:*

Be it known that I, BERT R. BENJAMIN, a citizen of the United States, residing at Oak Park, in the county of Cook and State of Illinois, have invented certain new and useful Improvements in Grain-Binders, of which the following is a full, clear, and exact specification.

My invention relates to grain binders. It has for its object to bind a sheaf in an improved manner whereby the band is positioned upon the sheaf in accordance with the length of the sheaf and maintained always in the desired relative relation to the heads and butts of the sheaves despite variation in the length of the grain. I attain this object by providing improved means operatively connected to a grain adjuster whereby, as the length of the grain varies, the binding mechanism is automatically adjusted so as to vary the position of the band in accordance with the length of the grain, all as hereinafter more fully set forth.

In the accompanying drawings I have, for purposes of illustration, shown one embodiment which my invention may assume in practice.

In these drawings: Figure 1 is a plan view of a binder equipped with my improvement. Fig. 2 is a sectional view on line 2—2 of Fig. 1. Fig. 3 is an end view taken approximately on line 3—3 of Fig. 1 looking in the direction of the arrow.

The binder shown is of standard construction comprising a frame having a fixed upper deck 1 and a longitudinally shiftable lower deck 2 on which is mounted the frame 3 of the binding mechanism. As in the usual construction, this binding mechanism is driven from suitable gearing 4 and comprises the usual elements, including a needle 5, discharge arms 6, spring sheaf guides 7, and a knotter breast plate 8. Further, as in the usual construction, the knotter breast plate is also preferably connected to a diagonally and longitudinally extending supplemental frame member 9 and is provided with a stubblewardly extending extension 10 movable longitudinally beneath a longitudinally extending guide or bail 11 fixed to the upper deck 1. The binder is further also provided with a head adjuster 12 pivotally connected at 13 to the upper deck and with a butt adjuster 14 of any desired type, shown to be of the endless butter type, pivotally connected on a shaft 15 in such a manner that it may be continuously driven from the elevator mechanism of the harvester in the usual way.

In my improvement the binding mechanism is adjusted automatically upon variation in the length of the grain. This is brought about in the embodiment shown herein by a connection between the binding mechanism and the grain adjusting mechanism, as, for instance, in the embodiment herein illustrated, the head adjuster 12. As shown, this adjuster is provided with a spring 16 operatively connected between the same and a fixed part of the upper deck 1 and normally tending to pull the adjuster inward to a point slightly inside of the full line position shown in Fig. 1. It is further provided with a grainwardly extending diagonally disposed shank 17 movable therewith about the pivot 13 and itself pivotally connected to a transversely and diagonally disposed rod 18 extending across the upper deck, which rod is in turn resiliently and slidably connected through opposing springs 19, 20 on the opposite sides of its point of connection, to an eye 21 on a transversely extending frame 22. In the opposite ends of this frame are journaled shafts 23, 24 carrying sprockets 25, 26 which are connected by a chain 27. As shown, the shaft 23 is also provided with a second sprocket 28 connected through a chain 29 with a sprocket 30 on the butter shaft 15 so that continuous rotation is imparted through this connection to the sprocket 26. Beneath this sprocket a suitable beveled gear 31 (Figs. 2 and 3) is fixed so that it rotates with the sprocket, and this beveled gear is normally positioned in a neutral position between a plurality of coöperating, preferably rigidly connected, beveled gears 32, 33 carried on a threaded member or worm 34. This worm 34 is preferably supported at one end in a bracket 35 upon the upper deck 1 between the gears 32, 33 and at its forward end is pivotally connected at 36 to a supplemental arm 37 projecting grainwardly from the binder frame 3, which arm, if desired, may be formed integral with that frame. This arm 37 is also preferably connected through a longitudinally extending member 38 with a pin 39 carried on the top of the frame 22 at a point between the point of connection of the spring pressed rod 18 and that of the sprocket 26, a longitudinally extending slot 40 being provided in this member so that a relative movement is permitted the parts, and the length of the slot being made adjustable by the provision of the adjustable slot closing member 41 carried on the member 38.

The operation of my improved construction is as follows: Let us assume that the parts are in the full line position shown in Figs. 1 and 3, wherein the beveled gear 31 is in its neutral position between the beveled gears 32, 33. If the grain coming over the binder deck increases in length, it will obviously force out the head adjuster 12 toward the dotted line position shown, against the tension of the spring 16. This will cause the shank 17 on the head adjuster to be thrown toward the dotted line position shown and will project the rod 18 in a forward direction longitudinally of the upper deck. Necessarily, through the connection of this rod to the frame 22, the latter frame will then be thrown toward the right, which will result in the continuously rotating beveled gear 31 being thrown into engagement with the then stationary gear 33 in such a manner that the latter will feed the threaded member 34 toward the left and thereby draw the binding mechanism toward the left, so that the needle 5 is moved farther toward the heads of the grain and the band upon the grain when the needle is operated, will of necessity be nearer the heads. This movement of the binding mechanism and the threaded member 34 will continue until the pin 39 on the frame 22 abuts against the end of the slot 40, whereupon the beveled gear 31 will be thrown out of mesh with the gear 33 and into its neutral position, thus interrupting the adjustment of the binding mechanism. In other words, as the grain increases in length, means are provided for adjusting the band upon the sheaves so that the position of this band is automatically varied with the length of the grain and the band is always maintained in the desired relative position between the heads and butts. Conversely, should shorter grain come over the binder deck, the beveled gear 31 would obviously be connected with the beveled gear 32 in such a manner as to feed the binding mechanism in the opposite direction. Here it will, of course, also be understood that the length of the slot 40 may be adjusted for operation of the mechanism between any predetermined limits, and that in lieu of the particular form of limiting and adjusting connection shown, any other suitable mechanism may be used to accomplish its purposes.

While I have in this application specifically described one embodiment which my invention may assume in practice, it is, of course, to be understood that the form shown herein is used for purposes of illustration and that the spirit of my invention may be embodied in other forms of construction than that illustrated.

What I claim as my invention and desire to secure by Letters Patent is:

1. In a binder, adjustable binding mechanism, and automatically controlled means for adjusting the same relatively to grain fed thereto.

2. In a binder, adjustable binding mechanism, and adjusting mechanism for said binding mechanism set in operation by the grain supplied thereto.

3. In a binder, adjustable binding mechanism, and means for adjusting the same set in operation by a variation in the length of grain supplied thereto.

4. In a binder, adjustable binding mechanism, and automatic means actuated by the grain fed thereto for shifting said binding mechanism longitudinally of said grain.

5. In a binder, adjustable binding mechanism, and automatic means controlled by the length of the grain fed to said mechanism for adjusting the latter longitudinally of said grain.

6. In a binder, adjustable binding mechanism, and means for adjusting the same longitudinally of grain fed thereto set in operation by an increase or decrease in the length of the latter.

7. In a binder, adjustable binding mechanism, and means automatically controlled by the length of the grain for maintaining said mechanism under varying grain conditions in a predetermined position with respect to the heads and butts of grain fed thereto.

8. In a binder, binding mechanism, means for adjusting the same in opposite directions, and means controlled by the length of the grain supplied to said binding mechanism controlling said adjusting means.

9. In a binder, adjustable binding mechanism, grain adjusting mechanism, and means controlled by said adjusting mechanism for adjusting said binder mechanism.

10. In a binder, adjustable binding mechanism, grain adjusting mechanism, and means actuated upon movement of said adjusting mechanism for adjusting said binding mechanism.

11. In a binder, adjustable binding mechanism, grain adjusting mechanism, and means operatively connected to said grain adjusting mechanism and controlled thereby for adjusting said binding mechanism.

12. In a binder, adjustable binding mechanism, grain adjusting mechanism, and means controlled by the length of the grain supplied to said adjusting mechanism controlling the adjustment of said binding mechanism.

13. In a binder, adjustable binding mechanism, grain adjusting mechanism, and means controlled by the pressure of the grain supplied to said adjusting mechanism controlling the adjustment of said binding mechanism.

14. In a binder, adjustable binder mechanism, head adjusting mechanism for the grain supplied thereto, and means controlled by said head adjusting mechanism controlling the adjustment of said binding mechanism.

15. In a binder, adjustable binding mechanism, head adjusting mechanism for the grain supplied thereto, and means set in operation by said head adjusting mechanism for adjusting said binding mechanism.

16. In a binder, adjustable binding mechanism, head adjusting mechanism for the grain supplied thereto, and means controlled by the grain pressure on said head adjusting mechanism for adjusting said binding mechanism.

17. In a binder, an adjustable binder deck, binding mechanism adjustable therewith, automatic means for adjusting said mechanism between predetermined limits, and means for varying said limits as desired.

18. In a binder, an adjustable binder deck, binding mechanism adjustable therewith, adjusting mechanism therefor, and means set in operation by the grain supplied to said binding mechanism controlling said adjusting mechanism.

19. In a binder, an adjustable binder deck, binding mechanism adjustable therewith, adjusting mechanism therefor, and means set in operation by the grain supplied to said binding mechanism controlling the direction of movement of said adjusting mechanism.

20. In a binder, adjustable binding mechanism, adjusting mechanism therefor comprising a normally operating driving element and a normally stationary driven element, and means controlled by the grain supplied to said binding mechanism controlling the connection of said elements.

21. In a binder, adjustable binding mechanism, grain adjusting mechanism, means for adjusting said binding mechanism including an operating member and an operated member, and means operatively connected to said grain adjusting mechanism controlling the connection of said members.

22. In a binder, binding mechanism, means for adjusting the same in opposite directions, grain adjusting mechanism coöperating with said binding mechanism, and means operatively connected between said grain adjusting mechanism and said binder adjusting means for automatically adjusting said binding mechanism in accordance with variations in the length of grain supplied to said adjusting means.

23. In a binder, a frame, binding mechanism carried thereon, means for adjusting the same in opposite directions comprising a threaded member, a plurality of spaced beveled gears thereon, a swinging constantly rotating member on said frame engageable with either of said beveled gears, and means controlled by the length of the grain supplied to said binding mechanism controlling the connection of said constantly operating member to said gears.

24. In a binder, a frame, binding mechanism carried thereon, means for adjusting the same in opposite directions comprising a threaded member, a plurality of spaced beveled gears thereon, a swinging constantly rotating member on said frame engageable with either of said beveled gears, means controlled by the length of the grain supplied to said binding mechanism controlling the connection of said constantly operating member to said gears, and means for establishing the limits of movement of said binding mechanism and simultaneously adjusting said constantly operating member into a neutral position between said beveled gears.

25. In a binder, a frame, binding mechanism carried thereon, means for adjusting the same in opposite directions comprising a threaded member, a plurality of spaced beveled gears thereon, a swinging constantly operating member on said frame engageable with either of said beveled gears, means controlled by the length of the grain supplied to said binding mechanism controlling the connection of said constantly operating member to said gears, and a slot and pin connection operatively connected between said binding mechanism and said swinging constantly operating member for establishing the limits of movement of said binding mechanism and simultaneously adjusting said constantly operating member into a neutral position between said beveled gears.

In testimony whereof I affix my signature, in the presence of two witnesses.

BERT R. BENJAMIN.

Witnesses:
RAY D. LEE,
FRANK A. ZABILKA.